April 18, 1967   A. L. BARCLAE   3,314,306
AIR VENT DEVICE FOR SEALED HOUSINGS
Filed June 8, 1965
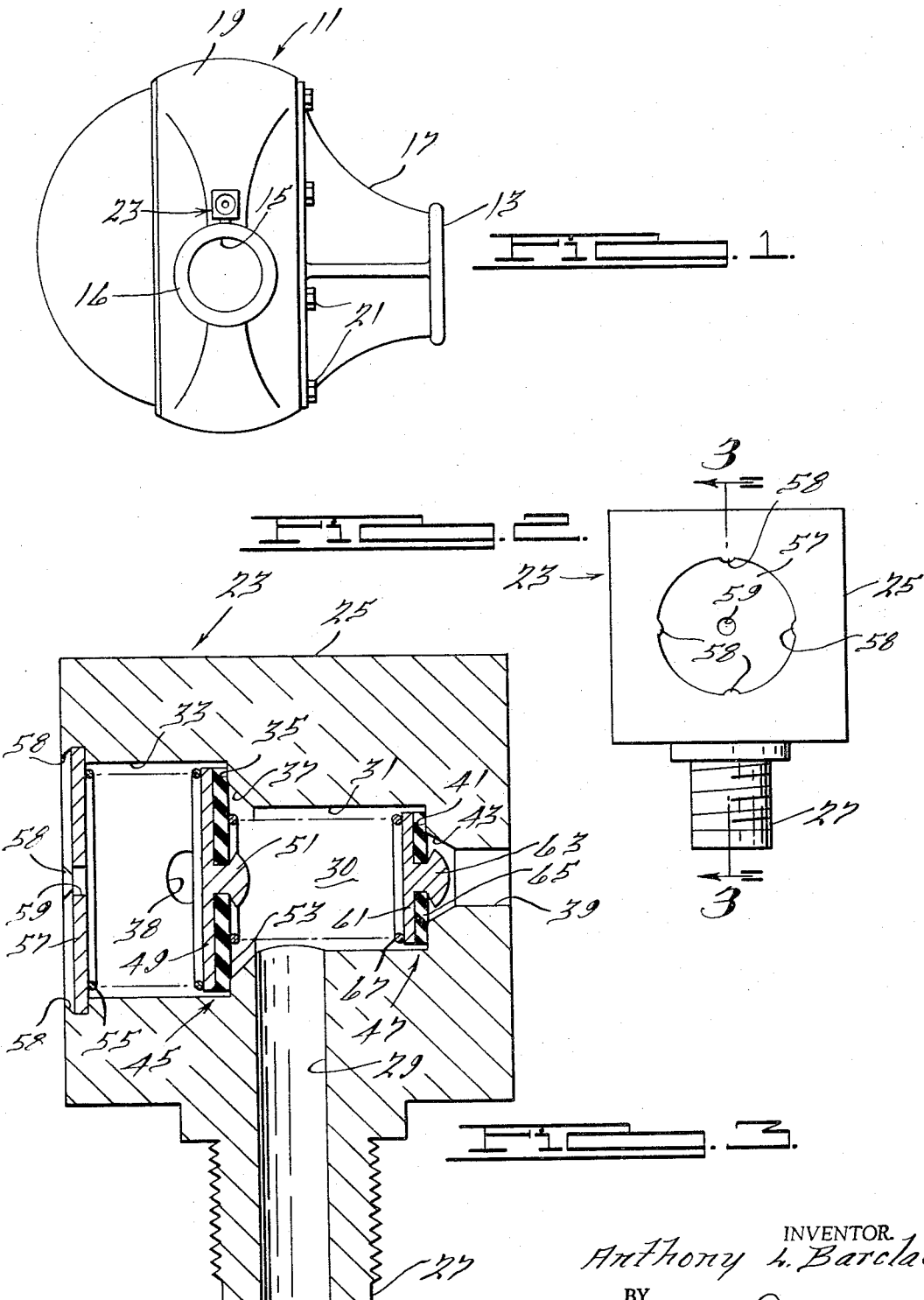
INVENTOR.
Anthony L. Barclae
BY
Harness, Dickey & Pierce
ATTORNEYS.

United States Patent Office 3,314,306
Patented Apr. 18, 1967

3,314,306
AIR VENT DEVICE FOR SEALED HOUSINGS
Anthony L. Barclae, Ferndale, Mich., assignor to Falcon Industries, Inc., Ferndale, Mich., a corporation of Michigan
Filed June 8, 1965, Ser. No. 462,452
2 Claims. (Cl. 74—606)

This invention relates to vent devices, and particularly to a dual acting air vent or breathing device for sealed housings including automobile axle and transmission housings and the like.

In housings such as, for example, those which enclose moving parts requiring constant immersion in lubricating oil, the housing interior often undergoes severe temperature changes ranging from atmospheric temperature to considerably higher temperatures depending upon the severity of use. Since these housings are generally sealed to keep foreign particles from getting into the housing and to prevent loss of lubricant, the noted temperature changes cause corresponding temperature changes in the lubricant and are reflected in pressure changes within the housing. Thus, the housing pressure increases during lubricant heating and decreases forming a subatmospheric or vacuum condition within the housing during cooling. If the housing is completely sealed as described above, these temperature and pressure changes inflict severe strain on the housing seals resulting in premature wear of and even complete failure of these seals. In addition, the high temperatures sustained in pressure build-up within the housing can be detrimental to the moving parts within the housing in causing premature wear or failure of these parts and in addition can undesirably heat other assemblies located near the housing.

Vent devices for housings of this type have been proposed in the past; however, these devices generally were directed to relieving simply pressure build-up within the housing and usually included a vent pipe open at all times to the atmosphere. While these prior vent devices did serve to relieve pressure build-up within the housing, dirt and other foreign particles could get into and contaminate the vent and the housing interior. Indeed, when the lubricant and housing interior undergo coating and a subatmospheric or vacuum condition is created therewithin, foreign particles are actually drawn in and eventually severely restrict or clog the vent thereby preventing it from functioning in the manner designed. Also, since these prior vent devices are constructed to remain open at all times, they allow heat loss during warm-up. This, in turn, prevents the lubricant from heating to operating temperature at the optimum rate and can result in wear of the parts. It is desirable then that these housings be vented to relieve both excessive pressure build-up and vacuum conditions within the housing and that the housing remain sealed at other times.

Main objects of the present invention are a vent device for sealed housings wherein the device is normally sealed and is pressure responsive to relieve both subatmospheric or vacuum and pressure build-up within the housing.

Further objects include a vent device of the above character adapted for use with a variety of sealed housings and which is a self-contained unit easily secured to the housing, has a minimum of moving parts and requires no special fasteners.

Additional objects include a vent device of the above character which is relatively inexpensive to manufacture, rugged in construction and reliable in use.

Other objects and advantages of this invention will become more apparent from a consideration of the following detailed description taken in conjunction with the drawings in which:

FIGURE 1 is an elevational view of a sealed axle differential housing having a vent device constructed according to the present invention mounted thereon;

FIG. 2 is an enlarged elevational view of the vent device of FIG. 1; and

FIG. 3 is an enlarged sectional view of FIG. 2 taken along the line 3—3 thereof.

Broadly described, this invention includes a unitary body adapted for securing to a sealed housing wherein the body has a passageway communicating with the interior of the housing and with a chamber having at least two apertures open to the atmosphere shoulder. A pair of pressure responsive valve members, each normally biased to seat on one of the shoulders and close a respective one of the apertures and the valve members are subjected to housing pressure within the chamber so as to cause one pressure responsive valve member to become unseated and open its associated aperture when pressure within the housing exceeds a selected level; and to cause the other pressure responsive valve member to become unseated and open its associated aperture when a vacuum or subatmospheric pressure condition exists within the housing.

Referring now more specifically to the drawings, FIG. 1 is a typical sealed housing installation of the present invention and illustrates an automotive rear axle differential housing shown generally at 11 having an opening 13 for receiving a drive shaft assembly (not shown) and a pair of openings 15 each formed in a laterally extending leg 16 (only one of which legs is shown) for receiving the rear axle assemblies (not shown). These housings generally are formed in two parts 17 and 19 removably secured by bolts 21 and serve to encase the differential gear assembly.

It is customarily required that the different gears within the housing 11 be lubricated at all times to reduce wear of the parts and to this end, a quantity of lubricating oil is disposed within the housing. So that none of this oil be permitted to leak from the housing 11 and that no dirt or other foreign particles can get into the housing, each of the openings 13 and 15 and the joint between the housing parts 17 and 19 are sealed. When the vehicle is not in operation, the differential gears or moving parts within the housing 11 are at rest and the temperature of the lubricant and within the housing is substantially atmospheric. However, the lubricant and the air within the housing 11 are heated when the differential is in operation and a build-up of pressure is realized within the housing tending to blow the housing seals outwardly. Conversely, when the differential ceases operation, the lubricant and air within the housing cools and a subatmospheric or vacuum condition is created within the housing tending to draw inwardly on these seals. In order to relieve these pressure conditions before they reach a level where harmul wear is imposed on the housing seals, a novel vent device, indicated generally at 23, is associated with the housing 11.

As seen in FIGS. 2 and 3, this vent device 23 includes a body 25 having a reduced end portion 27 secured to the housing 11. The body 25 is conveniently cut from steel rod extruded or otherwise suitably formed, and preferably has its end portion 27 threaded to engage complementary threads in the housing part 19 at a point above the normal level of the lubricant within the housing 11. So that the differential assembly within the housing 11 does not cause lubricant, grease or other substances within the housing to splash against the vent device 23 during use, the body 25 preferably is mounted upon one of the housing legs 16 and spaced from the main portion of the housing.

A passageway 29 extends axially through the end portion 27 from the outer edge thereof to and in communication with a chamber 30 formed by a bore 31 within the body 25. A counterbore 33 forms one part of a first aperture for the chamber 30 and extends from one side edge of the body 25 and is separated from one end of the bore 31 by a radial shoulder 35 and a countersunk portion 37. An exhaust port 38 forms the other part of the first aperture and extends through the body 25 transversely of the counterbore 33 and is spaced rearwardly of the shoulder 35. An opening or bore 39 forming a second aperture for the chamber 30 is separated from the bore 31 by a radial shoulder 41 and a countersunk portion 43. By this construction, the bores 33, 31 and 39 are conveniently and inexpensively formed in the body 25 after it has been cut from the extruded rod by drilling or machining from one side edge of the body and the passageway 25 is thereafter formed by drilling from the outer edge of the reduced end portion 27 through to the bore 31. This is an extremely simple and inexpensive forming process which can be carried out with a minimum number of steps and manpower and greatly reduces the overall cost of the finished product.

In use, the end portion 27 is threaded into the housing leg 16 so that the passageway 29 communicates the housing interior with the chamber 30. A pair of valve assemblies 45 and 47 seat against the shoulders 35 and 41, respectively, and are constructed so as to seal the chamber 30, and therefore the housing interior from the atmosphere. These valve assemblies 45 and 47 are responsive to pressure differentials between the housing interior and the atmosphere so that when the pressure within the housing 11 exceeds a predetermined level, indicative of a pressure level which can harm or cause premature wear of the housing seals, the valve assembly 45 unseats from the shoulder 35 and allows this excessive pressure to escape through the exhaust port 38. Conversely, when the pressure within the housing 11 falls below another predetermined level creating a subatmospheric or vacuum condition, the valve assembly 47 unseats from the shoulder 41 and allows air to be drawn into the housing 11 through the bore 39. In either case, when the pressure within the housing 11 and therefore in the chamber 30 is reinstated to within the desired range, the valve assembly 45 or 47, whichever had been unseated, reseats against the shoulder 35 or 41, respectively.

As seen in FIG. 3, the valve assembly 45 includes a thin plate 49 of metal or other suitable relatively stiff material freely movable within the counterbore 33. The plate 49 has a central projection 51 extending toward the chamber 30 and is adapted to be received in a central aperture formed in a seal pad 53. This pad 53 is formed of rubber or other suitably resilient and wear and corrosion-resistant material and is adapted to seat against the shoulder 35 and seals the chamber 30 from the port 38. A low rate compression spring 55 has one end in engagement with the plate 49 and its other end held in place by a plug 57 staked as at 58 or otherwise secured in the body 25 adjacent the end of the counterbore 33. The plug 57 has an aperture 59 to prevent a pressure pocket from forming behind the plate 49.

The valve assembly 47 similarly has a plate 61 freely movable within the bore 31 and has a central projection 63 received in a central aperture formed in a seal pad 65. The seal pad seats against the shoulder 41 sealing the chamber 30 from the bore or opening 39 and is normally biased toward this position by a low rate compression spring 67 which engages the plate 61 and the seal pad 53.

As can be seen in FIG. 3, the plate 49 and the seal pad 53 are exposed to atmospheric pressure through the port 38 and the opening 39, respectively, while the seal pad 53 and the plate 61 are subjected to the pressure within the chamber 30 and therefore within the housing 11. In addition, the spring 55 acts upon the plate 49 and is opposed by the spring 67 which acts upon the seal pad 53 and the plate 61. The spring 55 has a stiffness or K factor greater than the spring 67 so as to normally maintain the valve assembly 45 seated against the shoulder 35. Of course, the valve assembly 47 is normally seated against the shoulder 41 by the force of the spring 67. In order for the valve assembly 45 to unseat from the shoulder 35, the force on the seal pad 53 caused by the pressure within the housing 11 must overcome the force on the plate 49 caused by atmospheric pressure and the difference in the force of the springs 55 and 67. By carefully selecting the springs 55 and 67 and knowing the cross-sectional areas of the plate 49 and seal pad 53, the force or pressure differential at which the valve assembly 45 unseats from the shoulder 35 can be accurately controlled.

It is noted that the bore 31 is larger than the bore 39 and that this permits the use of the pad 53 which is larger in cross-sectional area than the pad 65. Since the force tending to move a member acted upon by fluid pressure is proportionate to the cross-sectional area of the member acted upon by the fluid pressure, atmospheric pressure exerts a greater force on the valve 45 than on the valve 47. This greater force supplements the net spring force on the pad 53 biasing it toward the shoulder 35 and allows the construction where both springs 55 and 67 can act on the valve 45 and where the spring 55 does not have to be substantially larger than the spring 67. This is desirable since it keeps the cost of these springs to a minimum and eliminates the need for a retaining shoulder in the bore 31 for the left-hand end of the spring 67, both of which help minimize the overall cost of the vent device.

In one conventional rear axle differential housing, a valve assembly 45 which unseats under a housing pressure which exceeds atmospheric pressure by 0.4 p.s.i. has been found to safely guard against premature wear of the housing seals while allowing the lubricant to warm up to operating temperature at the optimum rate. The valve assembly 47 may be constructed to unseat at about the same pressure differential or at a pressure differential greater or less than that unseating the valve assembly 45 as desired. In the above typical example, the valve assembly 47 is constructed to unseat at a point where the pressure within the housing 11 is about 0.5 p.s.i. below atmospheric pressure. It is to be understood, however, that these pressure differential valves are exemplary only and that the desired pressure differential level at which these valves unseat may vary from one installation to another. In addition, this invention is to be understood to be equally applicable for use in other sealed housings such as, for example, transmission and crankcase housings and the like where it is desirable to relieve both pressure build-up and a subatmospheric pressure condition within the housing without allowing the vent to remain open at all times.

By the present invention, there has been provided an improved vent device for sealed housings and while a preferred embodiment has been illustrated and described above in detail, various additions, substitutions, modifications and omissions may be made thereto without departing from the spirit of the invention as encompassed by the appended claims.

What is claimed is:

1. An assembly including a sealed differential housing having movable parts therein immersed in a lubricant and a pair of leg portions, said movable parts and lubricant being heated during operation of said parts and cooled when said parts are not in use causing pressure build-up and subatmospheric or vacuum conditions, respectively, within said housing, means for relieving said pressure build-up and vacuum conditions comprising a body secured to one of said housing leg portions above the normal level of the lubricant, said body having a passageway communicating with said housing and first and second apertures opening to the atmosphere and communicating with said passageway, pressure responsive means within said body, means biasing said pressure responsive means toward a position overlying and closing said apertures, said pressure responsive means being movable to open said first aperture when the pressure within said housing exceeds a first predetermined level and being movable to open said second aperture when said pressure falls below a second predetermined level.

2. A vent device comprising a body adapted to be secured to a sealing housing, a passageway in said body communicating with a chamber in said body and adapted to communicate with interior of the sealed housing, means defining a pair of spaced apertures in said body, one on either side of and communicating with said chamber and the atmosphere, a first radial shoulder separating a first one of said apertures from said chamber, a second radial shoulder having a smaller radial extent than said first shoulder separating said second one of said apertures from said chamber, a first valve member adapted to seat against said first shoulder and to close said first aperture, a second valve member adapted to seat against said second shoulder and to close said second aperture, a first compression spring engaging one side of said first valve member and biasing said first valve member toward said first shoulder, a second compression spring positioned in said chamber and having one end engaging the other side of said first valve member and the other end engaging one side of said second valve member and biasing said second valve member toward said second shoulder and said first valve member away from said first shoulder, said first valve member being exposed on said one side to atmospheric pressure and adapted to be exposed on the other side to housing pressure within said chamber, said second valve member adapted to be exposed on said one side to housing pressure in said chamber and on the other side to atmospheric pressure, whereby said first valve member is moved away from said first shoulder when the pressure in said chamber exceeds atmospheric pressure and the pressure differential between said first compression spring and said second compression spring, and said second valve member is moved away from said second shoulder when the pressure in said chamber falls below a predetermined level determined by atmospheric pressure and the pressure of said second compression spring against said second valve member.

References Cited by the Examiner
UNITED STATES PATENTS

| | | | |
|---|---|---|---|
| 1,498,358 | 7/1924 | De Krafft | 137—493.9 |
| 1,856,492 | 5/1932 | Marshall | 137—493.9 |
| 2,743,627 | 5/1956 | Christenson | 74—606 |
| 3,145,582 | 8/1964 | Wagner | 74—606 |

FRED C. MATTERN, Jr., *Primary Examiner.*

W. S. RATLIFF, *Assistant Examiner.*